(12) United States Patent
Ariyur et al.

(10) Patent No.: US 7,541,565 B2
(45) Date of Patent: Jun. 2, 2009

(54) TRACKING A MOVING OBJECT FROM A CAMERA ON A MOVING PLATFORM

(75) Inventors: Kartik B. Ariyur, Minneapolis, MN (US); Saad J. Bedros, West St. Paul, MN (US); Vassilios Morellas, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/177,550

(22) Filed: Jul. 22, 2008

(65) Prior Publication Data

US 2008/0277563 A1 Nov. 13, 2008

Related U.S. Application Data

(62) Division of application No. 11/470,048, filed on Sep. 5, 2006, now Pat. No. 7,411,167.

(51) Int. Cl.
G01J 1/20 (2006.01)
G01C 21/02 (2006.01)

(52) U.S. Cl. .................. 250/203.1; 250/203.6; 250/236; 382/103

(58) Field of Classification Search .............. 250/203.1, 250/203.6, 236; 382/103; 701/222; 244/3.15, 244/3.18, 3.17, 171
See application file for complete search history.

(56) References Cited

U.S. PATENT DOCUMENTS

| 4,739,401 A | 4/1988 | Sacks et al. |
| 2007/0286456 A1 | 12/2007 | Ariyur et al. |
| 2008/0118104 A1* | 5/2008 | Ariyur et al. ................ 382/103 |

* cited by examiner

*Primary Examiner*—Georgia Y Epps
*Assistant Examiner*—Tony Ko
(74) *Attorney, Agent, or Firm*—Fogg & Powers LLC

(57) ABSTRACT

A computer-readable medium having computer-executable instructions for performing a method. The method includes determining the transformation of an origin of an imaging device positioned in a vehicle and implementing exponentially stabilizing control laws based on the determined transformation and a distance to an imaged target. The method also includes generating a rotation output from the exponentially stabilizing control laws, generating a zoom output from the exponentially stabilizing control laws, determining a system latency in redirecting an optical axis and modifying a lens system along the optical axis, and determining the transformation of the origin of the imaging device with respect to global coordinates. A centroid of the target image is maintained within a selected distance from the origin of the imaging device. The apparent distance between the imaged target and the imaging device is also maintained.

5 Claims, 8 Drawing Sheets

TRACKING A MOVING OBJECT FROM A CAMERA ON A MOVING PLATFORM

CROSS REFERENCE TO RELATED APPLICATIONS

This application is a divisional of U.S. patent application Ser. No. 11/470,048, filed on Sep. 5, 2006 and entitled "TRACKING A MOVING OBJECT FROM A CAMERA ON A MOVING PLATFORM" (the '048 Application). The '048 Application is incorporated herein by reference.

BACKGROUND

Most technologies devoted to the tracking of objects by cameras use local models of image formation in conjunction with both model-based control such as Linear Quadratic Regulator (LQR) and non-model-based control such as Proportional-Integral Derivative (PID). The difficulty in these approaches is that each controller on each camera has to be specially tuned to the unique environmental conditions at its location. This makes the creation of large networks of cameras expensive.

It is desired to use a single camera to track an object from a moving platform in real time to identify the tracked target.

SUMMARY

One embodiment of the present invention is a computer-readable medium having computer-executable instructions for performing a method. The method includes determining the transformation of an origin of an imaging device positioned in a vehicle based on received first translation data and first rotation data, implementing exponentially stabilizing control laws based on the determined transformation and a distance to an imaged target, and generating a rotation output from the exponentially stabilizing control laws adapted to redirect an optical axis of the imaging device to maintain an image centroid within a selected distance from the origin of the imaging device. The method also includes generating a zoom output from the exponentially stabilizing control law, the zoom output adapted to modify a lens system of the imaging device, so an apparent distance between the imaged target and the imaging device is maintained. The method also includes determining a system latency in redirecting the optical axis and modifying the lens system along the optical axis. The method also includes determining the transformation of the origin of the imaging device with respect to global coordinates based on second translation data and second rotation data monitored during at least one of the pitch, the yaw, and the roll of the vehicle, the redirecting of the optical axis, the modifying of the lens system, and the system latency. The centroid of the target image is maintained within a selected distance from the origin of the imaging device, and the apparent distance between the imaged target and the imaging device is maintained.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
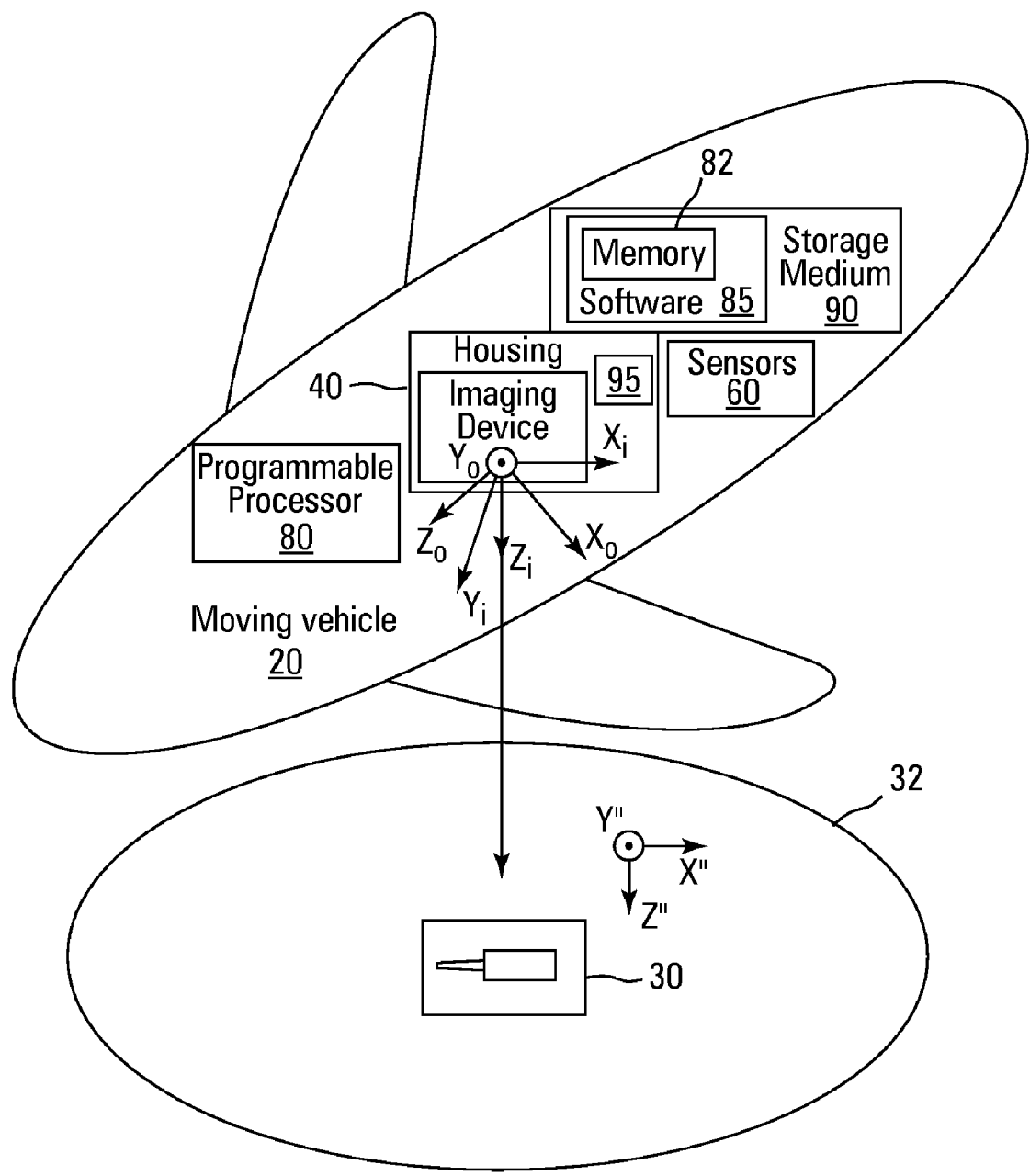
FIGS. 1 and 2 are diagrams representative of a system and a target as seen from a top and a side view, respectively.
Figure 2:
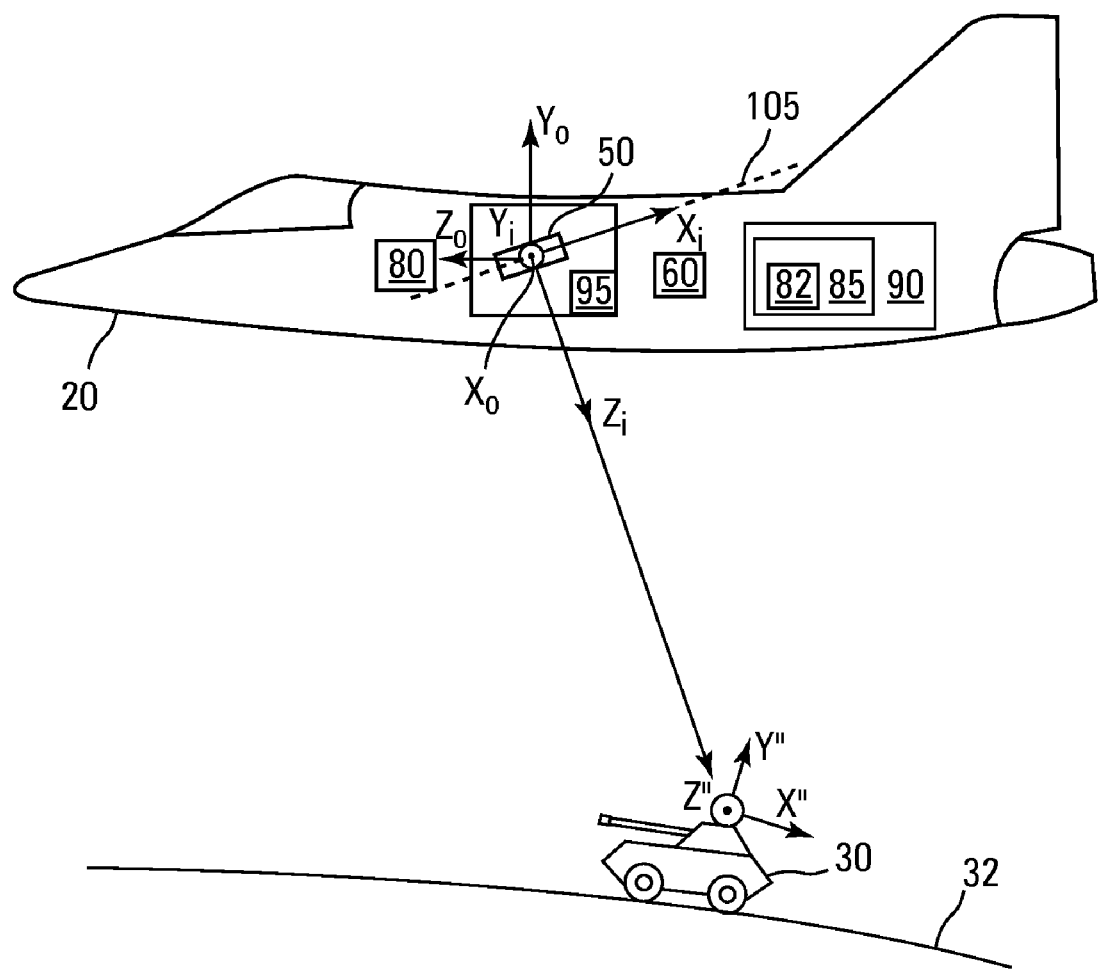

FIGS. 1 and 2 are diagrams representative of a system 10 and a target as seen from a top and a side view, respectively. The system 10 dynamically stabilizes a target image on an image plane of an imaging device in a vehicle. When the vehicle moves with respect to the target, the imaging device rotates and zooms so that the target image is always approximately centered on the imaging device with approximately the same target-image size. To accomplish this, the imaging device is dynamically rotated in response to sensed translations and rotations of the vehicle. Additionally, a lens system of the imaging device is dynamically zoomed towards or away from the target as the vehicle moves away from or towards the target, respectively. The rotation and zooming of the imaging device are responsive to output from exponentially stabilizing control laws that are implemented by a programmable processor executing on software. The exponentially stabilizing control laws account for latency in the system 10 by using forward prediction of tracked object's motion. The forward integration prediction can be performed using a double integrator point mass model.

As shown in FIGS. 1 and 2, a vehicle 20 is moving with respect to target 30 located on the surface of the earth represented generally by numeral 32. In this exemplary implementation, the moving vehicle 20, also referred to here as vehicle 20, is an airborne vehicle and the target 30 is a tank. Other types of vehicles and targets are possible. For example, the vehicle can be a water vehicle, a land vehicle, a satellite, or movable platform to which the imaging device is attached. The target 30 is any object, either stationary or moving. The target 30 is located at a position having global coordinates X", Y", and Z".

The system 10 to dynamically stabilize a target image is onboard the moving vehicle 20. The system 10 includes an imaging device 50 rotatably positioned within a housing 40 that is fixedly attached to the moving vehicle 20. The system 10 also includes sensors 60, a programmable processor 80, memory 82, software 85, a storage medium 90 and at least one motor 95. In one implementation of this embodiment, there is no housing 40 and the imaging device 50 is rotatably positioned within the moving vehicle 20. In this case the motors 95 hold the imaging device 50 in position.

The imaging device 50 is also referred to herein as tilt-zoom (PZT) camera 50 and includes a lens system generally represented by a single lens indicated by the numeral 56 in FIG. 2. The lens system 56 focuses images on an image plane shown in cross section in FIG. 2 as dashed line 105. The image plane 105 is in the plane containing a first axis $X_i$ and a second axis $Y_i$, which orthogonally intersect with each other at the origin represented generally by the numeral 51. An optical axis represented generally by the numeral 52 orthogonally intersects the image plane 105 at the origin 51. The optical axis 52 is identical to a third axis $Z_i$, thus the origin 51 is at the intersection of the image coordinate axes referred to herein as the imaging device axes $X_i$, $Y_i$ and $Z_i$. When the target image is focused on the image plane 105, the optical axis 52 is along a line of sight from the imaging device 50 to the target 30 so that an extension of the optical axis 52 intersects the target 30.

The imaging device 50 is capable of two rotations: pan and tilt. The imaging device 50 pans when it rotates about the second axis $Y_i$. The imaging device 50 tilts when it rotates about the first axis $X_i$. The imaging device 50 is fixed so that it cannot rotate about the third axis $Z_i$.

A fourth axis represented generally as $X_o$, a fifth axis represented generally as $Y_o$, and a sixth axis represented generally as $Z_o$ are referred to herein as the inertial axes which define an inertial coordinate system about which the rotations and translations of the moving vehicle 20 are sensed by sensors 60. In one implementation of this embodiment, the origin 51 is also at the origin of the inertial coordinate system (at the intersection of the $X_o$, $Y_o$ and $Z_o$ axes).

In another implementation of this embodiment, the origin of the inertial coordinate system (at the intersection of the $X_o$, $Y_o$ and $Z_o$ axes) and the origin 51 of the imaging device 50 are co-located at the center of gravity of the moving vehicle 20. In another implementation of this embodiment, the origin of the inertial coordinate system is located at the center of gravity of the moving vehicle 20 while the origin 51 of the imaging device 50 (at the intersection of the $X_i$, $Y_i$ and $Z_i$ axes) is offset from the center of gravity of the moving vehicle 20. In this case, translation and rotation algorithms are implemented by the programmable processor 80 when stabilizing the target image formed on the image plane 105 in order to adjust for this offset of the origin 51 from the center of gravity. Such translation and rotation algorithms are known in the art.

In an exemplary case, the imaging device 50 is mounted on the ceiling of the vehicle 20 and the inertial coordinate system is set as follows: the sixth axis $Z_o$ lies in a plane parallel to the plane of the ceiling and sixth axis $Z_o$ is identical to the optical axis 52 of the imaging device 50 when the optical axis 52 is at zero degrees (0°) of pan and zero degrees (0°) of tilt; the fifth axis $Y_o$ is perpendicular to the ceiling and fifth axis $Y_o$ is parallel to the second axis $Y_i$ when the optical axis 52 is at zero degrees of pan and zero degrees of tilt; the fourth axis $X_o$ is orthogonal to the optical axis 52 of the imaging device 50 and is identical to the first axis $X_i$ when the optical axis 52 is at zero degrees of pan and zero degrees of tilt.

The movable vehicle 20 is capable of three rotations; pitch, yaw, and roll. The vehicle 20 pitches when it rotates about the fourth axis $X_o$. The vehicle 20 yaws when it rotates about the fifth axis $Y_o$. The vehicle 20 rolls when rotates about the sixth axis $Z_o$.

The system 10 includes at least one motor 95 that mechanically couples the housing 40 and to the imaging device 50. When the system 10 is tracking a target 30, the motors 95 rotate the imaging device 50 so that the optical axis 52 always points toward the target 30. The motors 95 receive operational instructions that are based on rotation output generated when the programmable processor 80 executes exponentially stabilizing control laws. The rotation output initiates a rotation operation by the motors 95 to rotate the imaging device 50 within the housing 40. In one implementation of this embodiment, the motors 95 are attached to the vehicle 20 and mechanically couple the housing 40 and to at least one surface of the vehicle 20. The programmable processor 90 is communicatively coupled (either wired or wirelessly) to the motors 95 and the software 85 executing on the programmable processor 80 sends at least a portion of the information indicative of the operation instructions (or information derived therefrom such as a "compressed" version of such operation instructions) to the motors 95.

In one implementation of this embodiment, the motors 95 include one or more processors (not shown) to receive signals on or in which such operation instructions are encoded or otherwise included. Such processors activate the mechanical couplings based on the received operation instructions (or data indicative thereof). The motors 95 can include actuators such as piezo-electric actuators.

The sensors 60 sense translation and rotations of the vehicle 20 about the fourth axis $X_o$, the fifth axis $Y_o$ and the sixth axis $Z_o$. In one implementation of this embodiment, the sensors 60 include a first gyrocompass aligned to the fourth axis $X_o$, a second gyrocompass aligned to the fifth axis $Y_o$, a third gyrocompass aligned to the sixth axis $Z_o$, a first accelerometer aligned to the fourth axis $X_o$, a second accelerometer aligned to the fifth axis $Y_o$, a third accelerometer aligned to the sixth axis $Z_o$. In another implementation of this embodiment, the sensors 60 include an inertial measurement unit. In yet another implementation of this embodiment, the sensors 60 include an inertial measurement unit and a global positioning system. In yet another implementation of this embodiment, the sensors 60 include an inertial navigation system. In yet another implementation of this embodiment, the sensors 60 include an inertial navigation system and a global positioning system. In one implementation of this embodiment, the sensors 60 are located in the housing 40.

An exemplary inertial navigation unit is an inertial measuring unit (IMU) containing inertial sensors which measure components of angular rate and sensed acceleration. The measured angular rates and accelerations are used to compute the equivalent angular rates and sensed accelerations along the set of orthogonal IMU axes, such as $X_o$, $Y_o$ and $Z_o$, that constitute the IMU reference frame. For accurate inertial navigation the attitude (angular orientation) of the IMU axes $X_o$, $Y_o$ and $Z_o$ with respect to some selected navigation reference frame, such as global coordinates X", Y", and Z", are accurately determined before an initial movement of the vehicle 20 during an alignment procedure. During the alignment procedure, inertial sensor data and external aiding data are processed to determine the values of certain attitude parameters that define the attitude of the IMU with respect to the navigation reference frame or global coordinates X", Y", and Z". In one implementation of this embodiment, Attitude Heading and Reference Systems (AHRS) instruments, which do not navigate, use gyros and in some cases accelerometers to determine the heading, pitch and roll of the vehicle.

The programmable processor 80 is communicatively coupled to receive sensor data from the sensors 60 and to generate rotation output to stabilize the target image formed on the image plane of the imaging device 50 when the vehicle 20 moves with respect to the target 30. The programmable processor 80 also implements the exponentially stabilizing control laws to maintain a target-image size as the distance between the vehicle 20 and the target 30 changes. The programmable processor 80 generates zoom output to stabilize the target-image size within a selected size range as the distance between the vehicle 20 and the target 30 varies.

The exponentially stabilizing control laws are included in the software 85 that is stored or otherwise embodied within the storage medium 90 from which at least a portion of such program instructions are read for execution by the programmable processor 80. As the moving vehicle 20 tracks the target 30, the exponentially stabilizing control laws generate rotation output and zoom output, which the programmable processor 80 uses to generate the operational instruction for the motor 95. The zoom output stabilizes the target-image size within a selected size range. The rotation output stabilizes the image centroid within a selected distance from the origin 51 or at the origin 51 of the image plane 105.

The relative relationship between the inertial axes $X_o$, $Y_o$ and $Z_o$ and the imaging device axes $X_i$, $Y_i$, and $Z_i$ are described in U.S. patent application Ser. No. 11/423,659 having a title of "A STATIC CAMERA TRACKING FUNCTION" (also referred to here as the "H0012162-5607 Application") filed on Jun. 12, 2006. The H0012162-5607 Application is hereby incorporated herein by reference. The H0012162-5607 Application described algorithms that are used to control the tracking of a target by a static pan-tilt-zoom (PZT) camera. The present invention describes algorithms that are used to control the tracking of a target by a pan-tilt-zoom (PZT) camera, which offsets for the roll of the inertial system so that the image size and image location on the imaging plane are stabilized in the pan-tilt-zoom (PZT) camera.

Data related to the latency of the system 10 is stored in memory 82 and is retrieved by the programmable processor 80 as needed. Memory 82 comprises any suitable memory now known or later developed such as, for example, random access memory (RAM), read only memory (ROM), and/or registers within the programmable processor 80. In one implementation, the programmable processor 80 comprises a microprocessor or microcontroller. Moreover, although the programmable processor 80 and memory 82 are shown as separate elements in FIGS. 1 and 2, in one implementation, the programmable processor 80 and memory 82 are implemented in a single device (for example, a single integrated-circuit device). In one implementation, the programmable processor 80 comprises processor support chips and/or system support chips such as ASICs.

Figure 3:
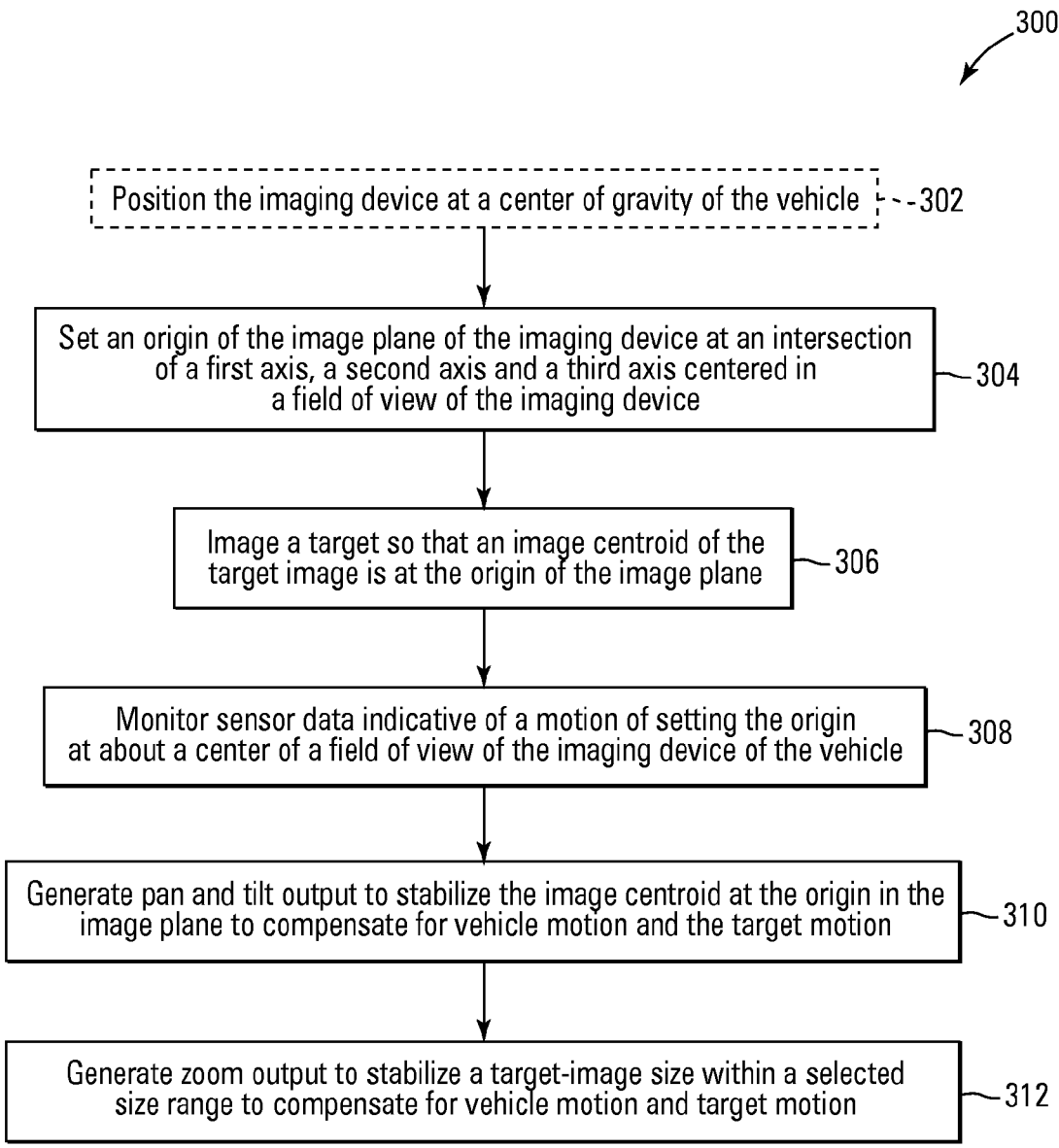
FIG. 3 is a flow diagram of one embodiment of a method to dynamically stabilize a target image formed on an image plane of an imaging device located in a moving vehicle.

FIG. 3 is a flow diagram of one embodiment of a method 300 to dynamically stabilize a target image formed on an image plane of an imaging device located in a moving vehicle. Method 300 describes a method to compensate for vehicle motion while tracking a moving target with an imaging device located in a moving vehicle. The terms "motion of the vehicle" and "vehicle motion" are used interchangeably herein. Method 300 is outlined for an exemplary implementation of system 10 with reference to FIGS. 1 and 2.

Block 302 is optional. At block 302, the imaging device is positioned at a center of gravity of the vehicle. If block 302 is not implemented and the imaging device is offset from the center of gravity of the moving vehicle, then additional translation and rotation algorithms are implemented during method 300 to adjust for the offset from the center of gravity. Such translation and rotation algorithms are known in the art. In one implementation of block 302, the imaging device 50 is positioned at a center of gravity of the vehicle 20 (FIGS. 1 and 2).

At block 304, the origin is set in the image plane of the imaging device at the intersection of a first axis, a second axis and a third axis. The origin is set at about a center of a field of view of the imaging device. In one implementation of block 304, the origin 51 is set in the image plane 105 of the imaging device 50 at the intersection of the first axis $X_i$, the second axis $Y_i$ and the third axis $Z_i$ as shown in FIG. 2. The origin 51 is set at about a center of a field of view of the imaging device 50.

Figure 4A:
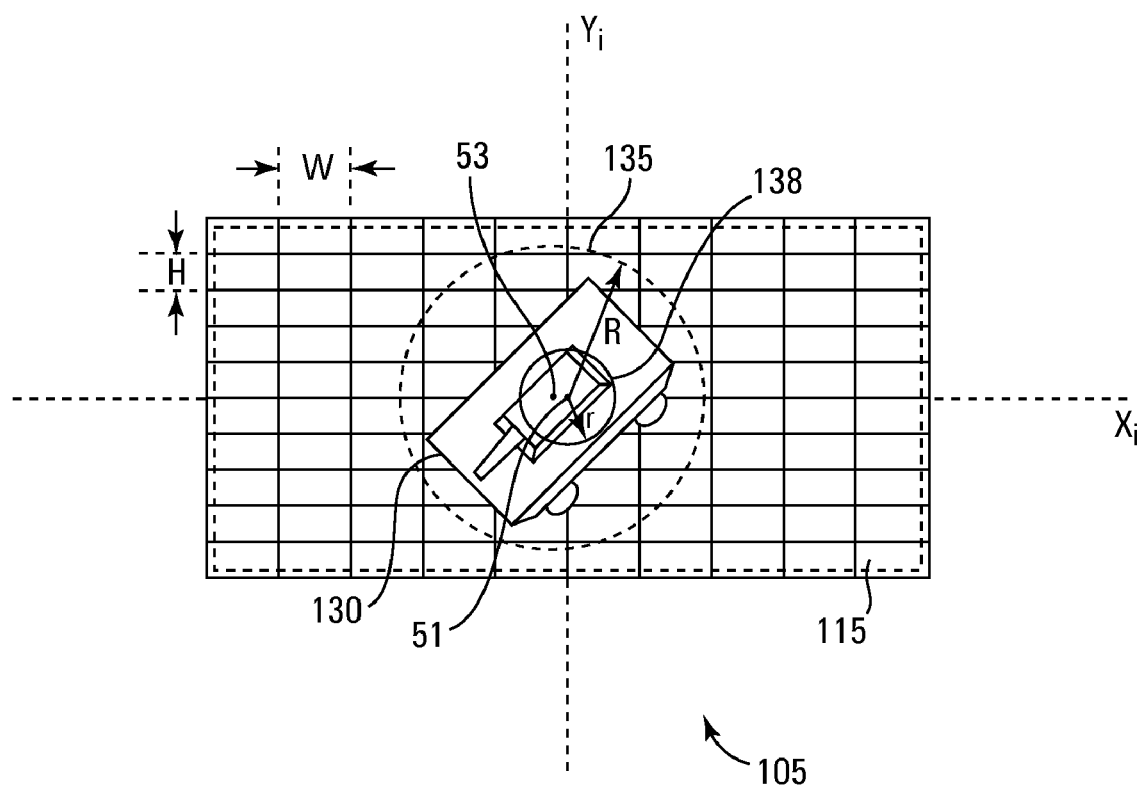
FIGS. 4A-4C are diagrams representative of the imaging elements in the imaging device on which target-images are focused from different vantage points.
Figure 4B:
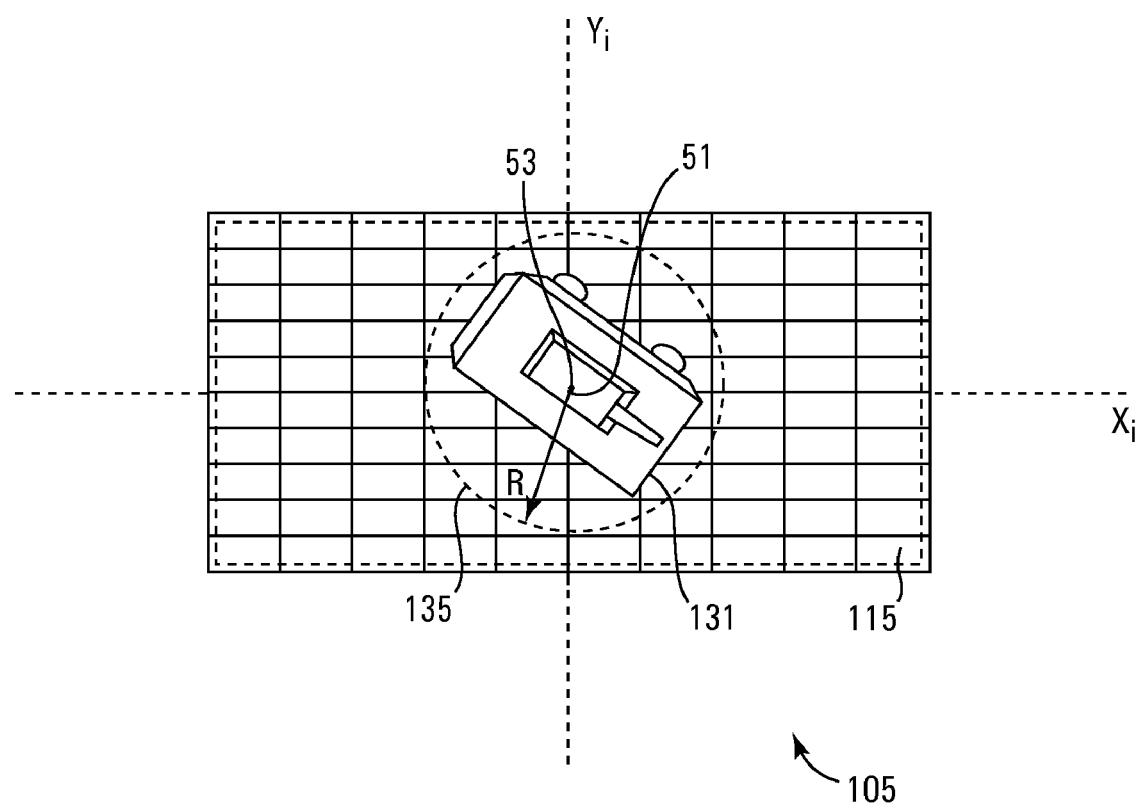

At block 306, a target is imaged so that an image centroid of the target image is at the origin of the image plane. FIGS. 4A-4B are diagrams representative of the imaging elements in the imaging device on which target-images are focused from different vantage points. FIG. 4A is a diagram representative of the imaging elements 115 in the imaging device 50 that are positioned in the image plane 105 that is horizontally bisected by the first axis $X_i$ and vertically bisected by the second axis $Y_i$. An exemplary target image 130 of the exemplary target 30 (FIGS. 1 and 2) is focused on a portion of the imaging elements 115. The image centroid 53 is an approximate center of the target image 130 and it is at about the intersection of first axis $X_i$ and second axis $Y_i$. The image centroid 53 is slightly offset from the origin 51 but the offset is small with respect to the field of view 110. The field of view 110 of the imaging device 50 overlaps a plurality of the imaging elements 115. The imaging elements each have a width generally represented as W and a height generally represented as H.

In one implementation of block 306, the target 30 is imaged so that an image centroid 53 of the target image is at the origin 51 of the image plane 105. In another implementation of this embodiment, the target 30 is imaged so that an image centroid 53 of the target image 130 is near the origin 51 of the image plane 105. As defined here, the image centroid of the target image is near the origin 51 (FIGS. 1 and 2) of the image plane 105 when the image centroid within a selected distance from the origin 51. In an exemplary case, the image centroid 53 is defined as being near the origin 51 to within the selected distance if the separation between them is less than 2% of the diagonal dimension of the imaging elements within the field of view 110.

At block 308, a programmable processor monitors sensor data indicative of a motion of the vehicle. The motion of the vehicle comprises a translation and a rotation. The sensors sense the translation and the rotation of the vehicle about the inertial coordinate system and input sensor data to the programmable processor. The programmable processor receives the sensor data from the sensors and determines if there has been a translation and/or rotation of the vehicle. In one implementation of block 308, the programmable processor 80 of system 10 monitors the sensor data indicative of a motion of the vehicle 20. The programmable processor 80 is communicatively coupled to the sensors 60 via a communication link that comprises one or more of a wireless communication link (for example, a radio-frequency (RF) communication link) and/or a wired communication link (for example, an optical fiber or copper wire communication link).

At block 310, pan and tilt output are generated to stabilize the image centroid at the origin in the image plane to compensate for the vehicle motion and the target motion. The pan and tilt output are generated by implementing exponentially stabilizing control laws. The exponentially stabilizing control laws are implemented, at least in part, on the sensor data. In one implementation of block 310, the programmable processor 80 executes software 85 that includes the exponentially stabilizing control laws in order to generate the pan and tilt output.

The moving vehicle 20 of FIGS. 1 and 2 experiences a general translation and rotation between inertial coordinates $X_o$, $Y_o$ and $Z_o$ of the vehicle 20 to imaging device coordinates $X_i$, $Y_i$ and $Z_i$ described as a transformation $T=T(\phi, \omega, \kappa)$:

$$T(\phi, \omega, \kappa) = \qquad (1)$$

$$\begin{pmatrix} \cos\phi\cos\kappa & \sin\omega\sin\phi\cos\kappa - \cos\omega\sin\kappa & \cos\omega\sin\phi\cos\kappa + \sin\omega\sin\kappa \\ \cos\phi\sin\kappa & \sin\omega\sin\phi\sin\kappa + \cos\omega\cos\kappa & \cos\omega\sin\phi\sin\kappa - \sin\omega\cos\kappa \\ -\sin\phi & \sin\omega\cos\phi & \cos\omega\cos\phi \end{pmatrix}$$

The pan angle $\phi$ is the angle of rotation about the second axis $Y_i$. The tilt angle $\omega$ is the angle of rotation about the first axis $X_o$. The roll angle $\kappa$ is the angle is the angle of rotation of the vehicle about the sixth axis $Z_o$.

Equation 1 leads to the following general expressions for image coordinates:

$$x_i = O_{c,x} + \cos\phi\cos\kappa x_0 + \qquad (2)$$
$$(\sin\omega\sin\phi\cos\kappa - \cos\omega\sin\kappa)y_0 + (\cos\omega\sin\phi\cos\kappa + \sin\omega\sin\kappa)z_0$$

$$y_i = O_{c,y} + \cos\phi\sin\kappa x_0 + \qquad (3)$$
$$(\sin\omega\sin\phi\sin\kappa + \cos\omega\cos\kappa)y_0 + (\cos\omega\sin\phi\sin\kappa - \sin\omega\cos\kappa)z_0$$

$$z_i = O_{c,z} - \sin\phi x_0 + \sin\omega\cos\phi y_0 + \cos\omega\cos\phi z_0 \qquad (4)$$

$O_c$ is the origin of the imaging system coordinates, such as origin 51. Differentiation of equations (2), (3) and (4) yields the following general images motion:

$$\dot{x}_i = \dot{O}_{c,x} + \cos\phi\cos\kappa \dot{x}_0 + \qquad (5)$$
$$(\sin\omega\sin\phi\cos\kappa - \cos\omega\sin\kappa)\dot{y}_0 + (\cos\omega\sin\phi\cos\kappa + \sin\omega\sin\kappa)\dot{z}_0 +$$
$$(-\sin\phi x_0 + \sin\omega\cos\phi y_0 + \cos\omega\cos\phi z_0)\cos\kappa\dot{\phi} +$$
$$((\cos\omega\sin\phi\cos\kappa + \sin\omega\sin\kappa)y_0 +$$
$$(-\sin\omega\sin\phi\cos\kappa + \cos\omega\sin\kappa)z_0)\dot{\omega} -$$
$$(\cos\phi\sin\kappa x_0 + (\sin\omega\sin\phi\sin\kappa + \cos\omega\cos\kappa)y_0 +$$
$$(\cos\omega\sin\phi\sin\kappa - \sin\omega\cos\kappa)z_0)\dot{\kappa} =$$
$$\dot{O}_{c,x} + \cos\phi\cos\kappa \dot{x}_0 + (\sin\omega\sin\phi\cos\kappa - \cos\omega\sin\kappa)\dot{y}_0 +$$
$$(\cos\omega\sin\phi\cos\kappa + \sin\omega\sin\kappa)\dot{z}_0 + ((\cos\omega\sin\phi\cos\kappa + \sin\omega\sin\kappa)y_0 +$$
$$(-\sin\omega\sin\phi\cos\kappa + \cos\omega\sin\kappa)z_0)\dot{\omega} +$$
$$(z_i - O_{c,z})\cos\kappa\dot{\phi} - (y_i - O_{c,y})\dot{\kappa}$$

$$\dot{y}_i = \dot{O}_{c,y} + \cos\phi\sin\kappa \dot{x}_0 + \qquad (6)$$
$$(\sin\omega\sin\phi\sin\kappa + \cos\omega\cos\kappa)\dot{y}_0 + (\cos\omega\sin\phi\sin\kappa - \sin\omega\cos\kappa)\dot{z}_0 +$$
$$(-\sin\phi x_0 + \sin\omega\cos\phi y_0 + \cos\omega\cos\phi z_0)\sin\kappa\dot{\phi} +$$
$$((\cos\omega\sin\phi\sin\kappa - \sin\omega\cos\kappa)y_0 -$$
$$(\sin\omega\sin\phi\sin\kappa + \cos\omega\cos\kappa)z_0)\dot{\omega}((\cos\phi\cos\kappa x_0 +$$
$$(\sin\omega\sin\phi\cos\kappa - \cos\omega\sin\kappa)y_0) +$$
$$(\cos\omega\sin\phi\cos\kappa + \sin\omega\sin\kappa)z_0)\dot{\kappa} =$$
$$\dot{O}_{c,y} + \cos\phi\sin\kappa \dot{x}_0 + (\sin\omega\sin\phi\sin\kappa + \cos\omega\cos\kappa)\dot{y}_0 +$$
$$(\cos\omega\sin\phi\sin\kappa - \sin\omega\cos\kappa)\dot{z}_0 +$$
$$((\cos\omega\sin\phi\sin\kappa - \sin\omega\cos\kappa)y_0 - (\sin\omega\sin\phi\sin\kappa + \cos\omega\cos\kappa)z_0)\dot{\omega} +$$
$$(z_i - O_{c,z})\sin\kappa\dot{\phi} + (x_i - O_{c,x})\dot{\kappa}$$

$$\dot{z}_i = \dot{O}_{c,z} - \sin\phi \dot{x}_0 + \sin\omega\cos\phi \dot{y}_0 + \qquad (7)$$
$$\cos\omega\cos\phi \dot{z}_0 - (\cos\phi x_0 + \sin\omega\sin\phi y_0 + \cos\omega\sin\phi z_0)\dot{\phi} +$$
$$(\cos\omega\cos\phi y_0 - \sin\omega\cos\phi z_0)\dot{\omega}$$

Equations (5), (6) and (7) are used to generate the stability control laws in the image coordinates that drive the centroid of the image to the origin of the image coordinate in order to compensate for roll. To make the control invariant to the roll of the vehicle we use the following coordinate system that rolls with the system.

The lateral and vertical positions of the image coordinate system through a roll of $\kappa$ about the sixth axis $Z_o$ are written as:

$$\begin{pmatrix} \tilde{x}_i \\ \tilde{y}_i \\ \tilde{z}_i \end{pmatrix} = R(\kappa) \begin{pmatrix} x_i \\ y_i \\ z_i \end{pmatrix} \qquad (8)$$

$$R(\kappa) = \begin{pmatrix} \cos\kappa & \sin\kappa & 0 \\ -\sin\kappa & \cos\kappa & 0 \\ 0 & 0 & 1 \end{pmatrix} \qquad (9)$$

Differentiating Equation (8) and simplifying yields:

$$\dot{\tilde{x}}_i = \cos\phi \dot{x}_o + \sin\omega\sin\phi \dot{y}_o + \cos\omega\sin\phi \dot{z}_o + \qquad (10)$$
$$(z_i - O_{c,z})\dot{\phi} + (\cos\omega y_o - \sin\omega z_o)\sin\phi\dot{\omega}\cos\kappa \dot{O}_{c,x} + \sin\kappa \dot{O}_{c,y}$$

$$\dot{\tilde{y}}_i = \cos\omega \dot{y}_o - \sin\omega \dot{z}_o - (\sin\omega y_o + \cos\omega z_o)\dot{\omega} - \sin\kappa \dot{O}_{c,x} + \cos\kappa \dot{O}_{c,y} \qquad (11)$$

which leads to the exponentially stabilizing control laws:

$$u_1(t - \tau_\phi) = -\delta_1(t) - \frac{1}{z_i - O_{c,z}}\Big(\cos\phi \dot{x}_o + \qquad (12)$$
$$\sin\omega\sin\phi \dot{y}_o + \cos\omega\sin\phi \dot{z}_o + \cos\kappa \dot{O}_{c,x} + \sin\kappa \dot{O}_{c,y} +$$
$$(\cos\omega y_o - \sin\omega z_o)\sin\phi \frac{1}{\sin\omega y_o + \cos\omega z_o}(\cos\omega \dot{y}_o - \sin\omega \dot{z}_o -$$
$$\sin\kappa \dot{O}_{c,x} + \cos\kappa \dot{O}_{c,y} - \alpha_\omega \tilde{y}_i) - \alpha_\phi \tilde{x}_i\Big)$$

$$u_2(t - \tau_\omega) = -\delta_2(t) + \qquad (13)$$
$$\frac{1}{\sin\omega y_o + \cos\omega z_o}(\cos\omega \dot{y}_o - \sin\omega \dot{z}_o - \sin\kappa \dot{O}_{c,x} + \cos\kappa \dot{O}_{c,y} - \alpha_\omega \tilde{y}_i),$$

$$u_3(t - \tau_f) = f\left(\frac{\tilde{z}_i}{z_i} - \alpha_f \frac{w_s - w_{ref}}{w_s}\right) \qquad (14)$$

In the pan, tilt and zoom control laws of equations (12), (13), and (14) respectively, $\delta_1(t)$ and $\delta_2(t)$ compensate respectively, for the yaw and pitch rates of the moving vehicle 20. The yaw rate, the pitch rate and the roll rates are obtained from the sensors 60 such as an inertial navigation system. The compensation is done in the $\tilde{x}_i$ and $\tilde{y}_i$ coordinates to eliminate the effect of roll.

The angles used in the control laws must account for vehicle motion in addition to imaging device motion from the previous control input. This is required because the movement of the imaging device 50 is based on the motors 95 which have a latency. The latency is known for a given amount of rotation. A forward integration of inertial measurements and control inputs provides the required latency offset. The zoom control law of Equation (14) automatically takes into account the translation of the moving vehicle 20.

The programmable processor 80 generates rotation output to stabilize the image centroid 53 within a selected distance from the origin 51. The rotation output is based on the output from equations (12), (13), and (14).

Figure 4C:
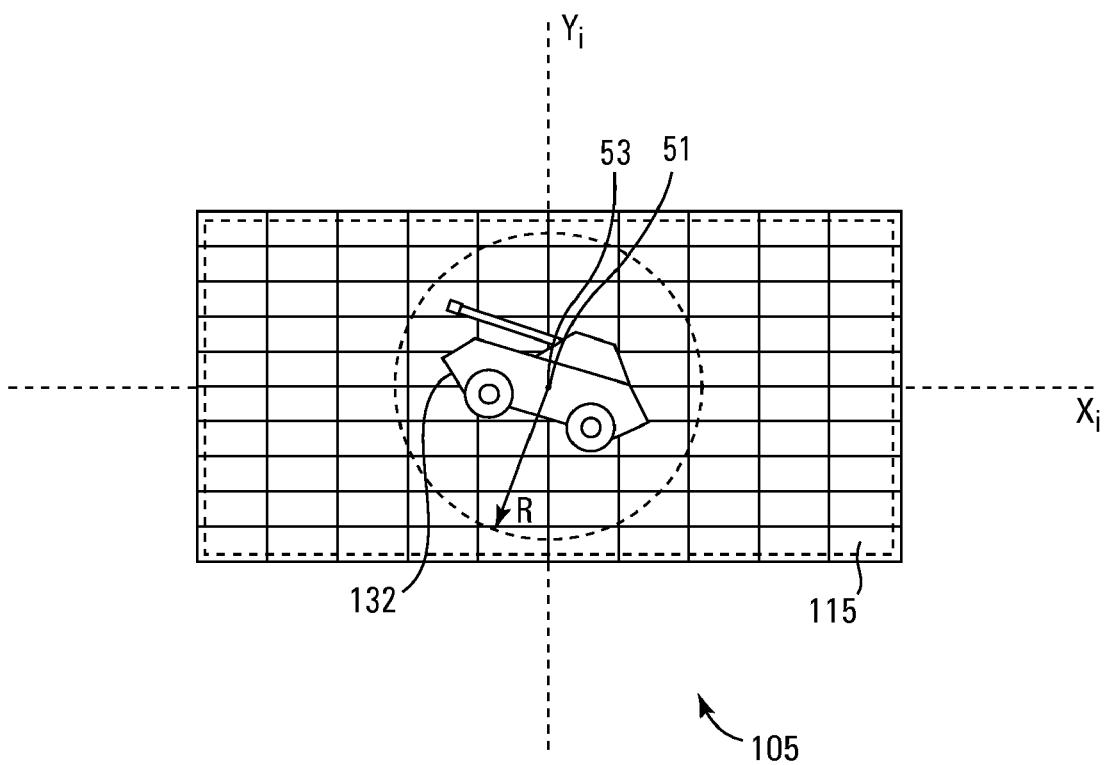

The system 10 maintains the image centroid within the selected distance from the origin as the vehicle moves with respect to the target. The system 10 maintains the image centroid within the selected distance from the origin based on the implementation of the exponentially stabilizing control laws (equations (12), (13), and (14)) which are executed by the programmable processor to output rotation output. The programmable processor generates instructions based on the rotation output that cause at least one motor to rotate the imaging device to pan and tilt. In the exemplary embodiment shown in FIGS. 1 and 2, the programmable processor 80 generates instructions that cause at least one motor 95 to rotate the imaging device 50 about at least one of the first axis $X_i$ and the second axis $Y_i$ so that the optical axis 52 of the imaging device 50 is along a line of sight to the target 30. FIGS. 4A-4C illustrate three exemplary target-images 130-132, respectively, focused from different vantage points at different times as the vehicle 20 moves and the viewing angle of the target 30 changes. As the vehicle 20 moves above the target 30 the target image 130 the target image 130 as seen imaged on the image plane 105 in FIG. 4A changes to the target image 131 as seen in FIG. 4B. The image centroid 53 of the target image 131 is still within the selected distance from the origin 51. As the vehicle 20 drops down to an elevation that is closer to the elevation of the target 30, the target image 131 changes until target image 132 as seen in FIG. 4C is imaged on the image plane 105. The image centroid 53 of the target image 132 is still within the selected distance from the origin 51 and the target 30 is imaged from a side view rather than from the top views of FIGS. 4A and 4B.

At block 312, the programmable processor generates zoom output to stabilize the target-image size within a selected size range to compensate for vehicle motion and target motion. The zoom output is based on the output from equations (12), (13), and (14). The selected size range is between a minimum size for the target image and a maximum size for the target image. In one implementation of this embodiment, the maximum size is a maximum selected radius from the origin and the target image fits within the circle of the maximum selected radius centered at the origin. In this same implementation, the minimum size is minimum selected radius from the origin and the edges of the target image extend beyond the circle of the minimum selected radius centered at the origin.

In one implementation of this embodiment, the maximum selected radius is a selected maximum percentage of the shortest dimension in the field of view of the imaging device and the minimum selected radius is a selected minimum percentage of the shortest dimension in the field of view of the imaging device. In the exemplary embodiment shown in FIGS. 4A, 4B, and 4C, the target images 130, 131 and 132, respectively, fit within the circle 135 of the maximum selected radius R that is centered at the origin 51 in the field of view 110 of the image plane 105. Likewise, the target image 130 extends beyond the circle 138 (FIG. 4A) of the minimum selected radius r centered at the origin 51.

The system 10 maintains the target-image size within the selected size range based on the implementation of the exponentially stabilizing control laws which are executed by the programmable processor 80 to generate zoom output. As the vehicle 20 moves in closer to the target 30, and drops down to the same elevation as the target 30, the zoom output causes the motors 95 to zoom the imaging device 50 out from the target 30 so the target image size is maintained as shown in FIGS. 4B and 4C.

The control design consists of two parts: the first is the tracking of the target image 130 on the image plane 105 (FIG. 4A) based on rotation outputs from the programmable processor 80, and the second is the regulation of target-image size on the image plane 105 by control of focal length (zoom control) based on zoom outputs from the programmable processor 80.

The zoom control ensures this over most of the field of view 110 (FIGS. 4A-4C) of the imaging device 50 (FIGS. 1 and 2). However, this control naturally degrades when the tracked target 20 is very far from the imaging device 50 or very close to the imaging device 50, and the zoom limits are reached. The zoom control degradation is ameliorated in the following ways: when the vehicle 20 is closer to the target 30, the imaging device 50 focuses on a smaller portion of the target 30, and when the target 30 is far away, the imaging device 50 focuses on a larger portion of the target 30. Moreover, for the near field problem, where the vehicle 20 approaches the target 30, the prediction time is increased and the target 30 moves into position to view the target 30 once it is sufficiently far away. The rotation outputs and the zoom outputs are computed for a future time taking into account the actuator latencies.

The objective of the control laws is to maintain the center of the target image at the center of the image plane. The image center can be measured by a particle filter algorithm, as is known in the art. The pan and tilt rates control the center point (or any other reference point) of the image plane.

All the latencies, such as the latency of the actuators, the latencies of the motors, are compensated for by using the forward prediction of the tracked object's motion. The forward prediction can be performed, for example, by using a double integrator point mass model, which relates $\dot{x}_0$, $\dot{y}_0$, $\dot{z}_0$ with $x_o$, $y_o$, and $z_o$, respectively, in the equations above.

Figure 5:
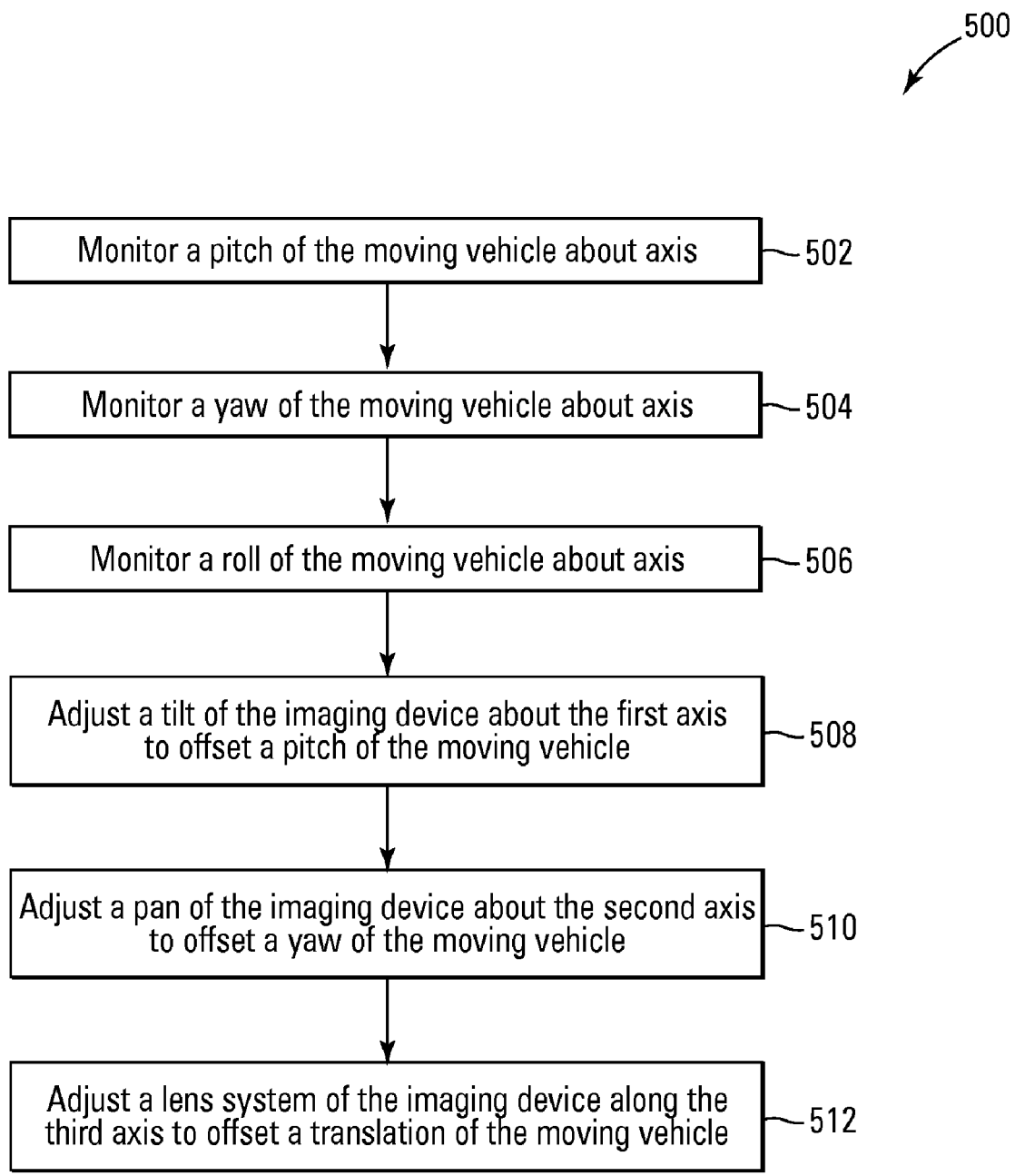
FIG. 5 is a flow diagram of one embodiment of a method to monitor system data and to dynamically stabilize a target image formed on an image plane of an imaging device located in a moving vehicle

FIG. 5 is a flow diagram of one embodiment of a method 500 to monitor system data and to dynamically stabilize a target image formed on an image plane of an imaging device located in a moving vehicle.

At block 502, the programmable processor monitors a pitch of the moving vehicle about a fourth axis. In one implementation of this embodiment, the programmable processor 80 monitors a pitch of the moving vehicle 20 about the inertial axis $X_o$. At block 504, the programmable processor monitors a yaw of the moving vehicle about a fifth axis. In one implementation of this embodiment, the programmable processor 80 monitors a yaw of the moving vehicle 20 about the inertial axis $Y_o$. At block 506, the programmable processor monitors a roll of the moving vehicle about a sixth axis. In one implementation of this embodiment, the programmable processor 80 monitors the roll of the moving vehicle 20 about the inertial axis $Z_o$.

At block 508, motors adjust a tilt of the imaging device about the first axis to offset the pitch of the moving vehicle. The adjustment of the tilt is based on the generated rotation output. In one implementation of this embodiment, motors 95 adjust a tilt of the imaging device about the first axis $X_i$ to offset the pitch of the moving vehicle 20.

At block 510, the motors adjust a pan of the imaging device about the second axis to offset for the yaw of the moving vehicle. The adjustment of the pan is based on the generated rotation output. In one implementation of this embodiment, motors 95 adjust the pan of the imaging device about the axis $Y_i$ to offset the yaw of the moving vehicle 20. Blocks 502, 504, 508 and 510 are implemented to maintain the image centroid within the selected distance from the origin.

At block 512, the motors adjust a lens system of the imaging device along the third axis to offset for a translation of the moving vehicle. The adjustment of the lens system is based on the generated zoom output to stabilize the target-image size to a selected size. In one implementation of this embodiment, motors 95 adjust the lens system 56 of the imaging device 50 about third axis $Z_t$ to offset for the translation and the roll of the moving vehicle 20. Blocks 506 and 512 are implemented to maintain the target-image size within the selected size range.

Figure 6:
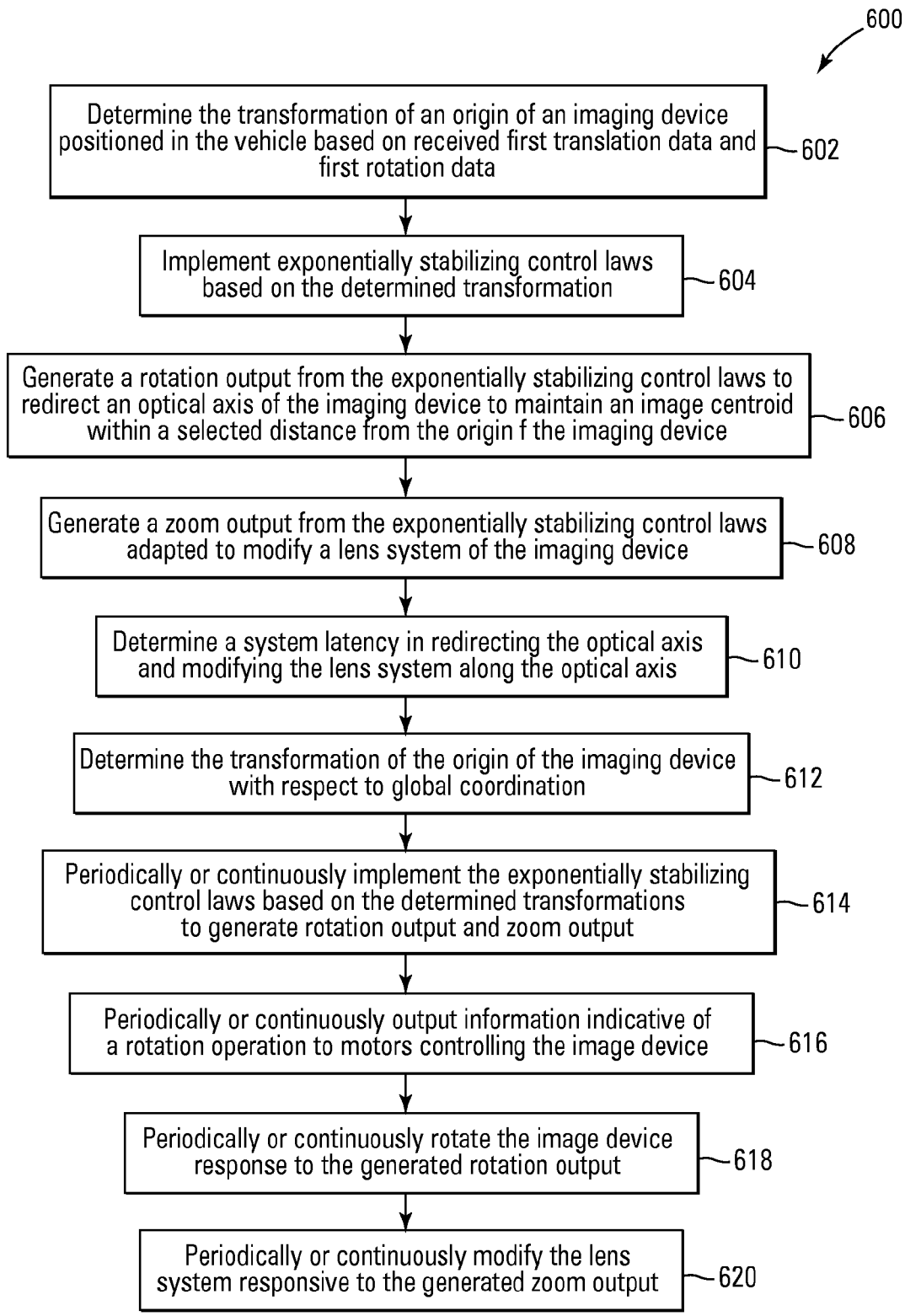
FIG. 6 is a flow diagram of one embodiment of a method to dynamically stabilize a target image formed on an image plane of an imaging device located in a moving vehicle.

FIG. 6 is a flow diagram of one embodiment of a method 600 to dynamically stabilize a target image formed on an image plane of an imaging device located in a moving vehicle. The method 600 describes the process of tracking a target through sequential implementations of the exponentially stabilizing control laws.

At block 602, the programmable processor determines the transformation of an origin of an imaging device positioned in the vehicle based on received first translation data and first rotation data. The first translation data and first rotation data can be the first sensor data received from the sensors after the initiation of a target tracking. In one implementation of this embodiment, the programmable processor 80 determines the transformation of an origin 51 of an imaging device 50 positioned in the vehicle 20 based on first translation data and first rotation data received from the sensors 60.

At block 604, the programmable processor implements exponentially stabilizing control laws based on the determined transformation. In one implementation of this embodiment, the programmable processor 80 implements exponentially stabilizing control laws based on the transformation of the origin 51 determined at block 602.

At block 606, the programmable processor generates a rotation output from the exponentially stabilizing control laws. The rotation output is used to redirect an optical axis of the imaging device to maintain an image centroid within a selected distance from the origin of the imaging device. In one implementation of this embodiment, the programmable processor 80 generates a rotation output from the exponentially stabilizing control laws and outputs instructions to motors 95 to redirect the optical axis 52 of the imaging device 50 to maintain the image centroid 53 near the origin 51 of the imaging device 50.

At block 608, the programmable processor generates a zoom output from the exponentially stabilizing control laws adapted to modify a lens system of the imaging device. The apparent distance between an imaged target and the imaging device is maintained since the target-image size is maintained as the moving vehicle moves towards and away from the target. In one implementation of this embodiment, the programmable processor 80 generates a zoom output from the exponentially stabilizing control laws and then the lens system 56 of the imaging device 50 is adjusted so the edges of the target image 130 always fits within the selected size range between circle 135 and circle 138 (FIG. 4A). By making the difference between the radius R of circle 135 and radius r of circle 138 small, the apparent distance between an imaged target 30 and the imaging device 50 in the vehicle 20 is maintained since the target-image size is maintained as the moving vehicle 20 moves towards and away from the target 30. In one implementation of this embodiment, the difference between the radius R of circle 135 and radius r of circle 138 is larger and then the target-image size is maintained within a range of target image sizes from small to large. In one implementation of this case, the complete target is always imaged within the radius R of circle 135. In another implementation of this embodiment, only a subsection of the complete target is always imaged within the radius R of circle 135.

At block 610, the programmable processor determines a system latency in redirecting the optical axis and modifying the lens system along the optical axis. As described above with reference to FIG. 3, the latencies of the actuators, the latency of image processing, the latency of the network, and the latency in the implementation of the control law are included in the determinations. In one implementation of this embodiment, the programmable processor 80 determines a system latency for system 10 in the redirecting the optical axis 52 and modifying the lens system 56 along the optical axis 52. In another implementation of this embodiment, the latencies of the actuators are about 100 ms, the latency of image processing is 200 ms, the latency of the network is 100 ms, and the latency in the implementation of the control law is in the range from about 50 ms to about 100 ms.

At block 612, the programmable processor determines the transformation of the origin of the imaging device with respect to global coordinates, such as the coordinates of the target. Specifically, the transformation of the body axes of the airplane with respect to an inertial reference frame fixed to the ground is determined. The second determination of block 612 follows the determination that was made during block 602. The second determination is based on second translation data and second rotation data that was monitored during at least one of the pitch, the yaw, and the roll of the vehicle that occurred during the implementation of blocks 604-608. The second determination is also based on the redirecting of the optical axis, the modifying of the lens system, and the system latency. Based on the second determination, the image centroid of the target image continues to be maintained within a selected distance from the origin of the imaging device and the apparent distance between the imaged target and the imaging device continues to be maintained. In one implementation of this embodiment, the programmable processor 80 determines the transformation of the origin 51 of the imaging device 50 with respect to global coordinates X", Y", and Z" (FIG. 1).

The programmable processor continues to determine the transformation of the origin of the imaging device with respect to global coordinates as the vehicle moves. In one implementation of this embodiment, the determinations are made periodically. In such an implementation, an exemplary period is 1 μs. In another such implementation, the exemplary period is 10 ms. In another implementation of this embodiment, the determinations are made continuously on data that is streaming into the programmable processor from the sensors 60. Blocks 614-620 are implemented based on the periodically or continuously determined transformations.

At block 614, the programmable processor periodically or continuously implements the exponentially stabilizing control laws based on the determined transformations to generate rotation output and zoom output. In one implementation of this embodiment, the programmable processor 80 periodically or continuously implements the exponentially stabilizing control laws. At block 616, the programmable processor continuously or periodically outputs information indicative of a rotation operation to the motors controlling the imaging device. In one implementation of this embodiment, the programmable processor 80 continuously or periodically outputs information indicative of a rotation operation to the motors 95 that control the rotation of the imaging device 50. In another implementation of this embodiment, the programmable processor 80 continuously or periodically outputs information indicative of a zoom operation to the motors 95 that control the lens system 56 of the imaging device 50 in order to offset for a translation and/or roll of the vehicle 20.

At block 618, the programmable processor periodically or continuously rotates the imaging device responsive to the generated rotation output to continuously maintain the image centroid to within the selected distance from the origin of the imaging device.

At block 620, the motors periodically or continuously modify of the lens system responsive to the generated zoom output so that the apparent distance between the imaged target and the imaging device is continuously maintained by compensating for the vehicle motion.

In one implementation of this embodiment, the methods 300, 500 and 600 are implemented only to maintain the image centroid at or near the origin of the imaging device. In such an implementation, one point on the target is chosen to be the image centroid and as the target image expands beyond the field of view of the imaging device, the same point on the target is at or near the origin of the imaging device.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs)."

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A computer-readable medium having computer-executable instructions for performing a method comprising:
    determining the transformation of an origin of an imaging device positioned in a vehicle based on received first translation data and first rotation data;
    implementing exponentially stabilizing control laws based on the determined transformation and a distance to an imaged target;
    generating a rotation output from the exponentially stabilizing control laws adapted to redirect an optical axis of the imaging device to maintain an image centroid within a selected distance from the origin of the imaging device;
    generating a zoom output from the exponentially stabilizing control laws adapted to modify a lens system of the imaging device, wherein an apparent distance between the imaged target and the imaging device is maintained;
    determining a system latency in redirecting the optical axis and modifying the lens system along the optical axis; and
    determining the transformation of the origin of the imaging device with respect to global coordinates based on second translation data and second rotation data monitored during at least one of the pitch, the yaw, and the roll of the vehicle, the redirecting of the optical axis, the modifying of the lens system, and the system latency, wherein the centroid of the target image is maintained within a selected distance from the origin of the imaging device and the apparent distance between the imaged target and the imaging device is maintained.

2. The computer-readable of claim 1, the medium further comprising instructions for:
    periodically implementing the exponentially stabilizing control laws based on the determined transformations to generate rotation output and zoom output;
    periodically rotating the imaging device responsive to the generated rotation output to continuously maintain the image centroid to within the selected distance from the origin of the imaging device; and
    periodically modifying the lens system responsive to the generated zoom output wherein an apparent distance between the imaged target and the imaging device is continuously maintained in order to compensate for the vehicle motion.

3. The computer-readable of claim 2, wherein the period is less than ten millisecond.

4. The computer-readable of claim 1, the medium further comprising instructions for:
    continuously implementing the exponentially stabilizing control laws based on the determined transformations to compensate for the vehicle motion;
    continuously rotating the imaging device responsive to the generated rotation output to continuously maintain the image centroid to within the selected distance from the origin of the imaging device; and
    continuously modifying of the lens system responsive to the generated zoom output wherein an apparent distance between the imaged target and the imaging device is continuously maintained in order to compensate for the vehicle motion.

5. The computer-readable of claim 4, the medium further comprising instructions for:
    continuously outputting information indicative of a rotation operation to motors controlling the imaging device.

* * * * *